United States Patent
Thenthiruperai et al.

(10) Patent No.: US 8,130,937 B1
(45) Date of Patent: Mar. 6, 2012

(54) USE OF SPEECH RECOGNITION ENGINE TO TRACK AND MANAGE LIVE CALL CENTER CALLS

(75) Inventors: Balaji S. Thenthiruperai, Overland Park, KS (US); Jesse Kates, Kansas City, MO (US); Kristen Miller, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1099 days.

(21) Appl. No.: 11/158,549

(22) Filed: Jun. 21, 2005

(51) Int. Cl.
*H04M 3/00* (2006.01)

(52) U.S. Cl. .............................. 379/266.02; 379/265.01

(58) Field of Classification Search ............ 379/265.01, 379/265.03, 265.06, 88.01, 88.09, 266.02
See application file for complete search history.

(56) References Cited

U.S. PATENT DOCUMENTS

| | | | |
|---|---|---|---|
| 4,982,420 A * | 1/1991 | Theis | 379/68 |
| 6,510,414 B1 | 1/2003 | Chaves | 704/270 |
| 6,600,821 B1 * | 7/2003 | Chan et al. | 379/265.07 |
| 6,724,887 B1 * | 4/2004 | Eilbacher et al. | 379/265.03 |
| 6,771,746 B2 | 8/2004 | Shambaugh et al. | 379/88.13 |
| 6,823,054 B1 | 11/2004 | Suhm et al. | 379/134 |
| 6,907,119 B2 | 6/2005 | Case et al. | 379/218.01 |
| 2002/0103647 A1 * | 8/2002 | Houplain | 704/260 |
| 2005/0187753 A1 * | 8/2005 | Salter | 704/2 |
| 2006/0239440 A1 * | 10/2006 | Shaffer et al. | 379/265.02 |
| 2006/0251237 A1 * | 11/2006 | Singer | 379/265.05 |

\* cited by examiner

*Primary Examiner* — Rasha Al Aubaidi

(57) ABSTRACT

A speech recognition engine monitors live call center calls between live callers and live operators and detects that certain key words are spoken. The detected key words can then be used as a basis to identify issues that are raised in the call, so as to facilitate (i) generation of statistical reports regarding call center call issues and (ii) real-time assistance of the call center operator, such as directing the call center operator to ask certain questions or take certain other actions.

12 Claims, 1 Drawing Sheet

USE OF SPEECH RECOGNITION ENGINE TO TRACK AND MANAGE LIVE CALL CENTER CALLS

BACKGROUND OF THE INVENTION

This invention relates generally to the field of call center systems and related methods for providing customer service for callers interacting with the call center via a telephone. More particularly, this invention relates to a call center with a tightly integrated speech recognition platform that assists in handling calls and preparing reports on call center activity.

Many, if not most large businesses, government agencies, and other organizations serving a distributed base of customers maintain a call center for handling customer calls. The calls could be from potential or current customers. The type of calls can be related to current account information, billing issues, order entry, delivery, reservations, technical support, etc. For example, an airline company will typically build and staff a call center to handle flight reservations and arrival and departure times for its passengers. As another example, a phone company may have a call center designed to handle questions from subscribers regarding their accounts, service plans, inquiries as to service availability and new features, complaints about invoices, etc. Such call centers may be completely automated, but more often include a combination of a computer-based call attendant command platform that includes processing entities and system software that handles requests for information that can be handled completely in an automated fashion, coupled with a staff of trained attendants. Some call centers are directed to issues that are not usually amenable to automation (such as technical support) and such calls are directly routed to trained staff with little or no intervening processing by an automated computer system.

Most calls coming into a call center are unpredictable, in terms of the issues they cover. The number of issues that can arise will depend of course on the particular organization in question and the nature of its business and customers, but the number of issues can easily be in the hundreds in a two week period. Moreover, the issues that arise vary from week to week, as the business itself operates in a dynamic environment that is constantly changing (new products, new prices, competitor offerings, weather conditions, market volatility, interest rates, government regulations, etc.).

The present inventors have appreciated that, given the dynamic nature of call center activity, it is difficult to track call center activity and predict trends. Moreover, it is difficult to predict when certain issues are likely to arise, etc. Accordingly, it is difficult to appropriately train operators to handle the variety of topics.

In practice, call center operators typically allocate calls to call center operators based on some rough measure of the nature of the call, often determined by user response to prompts. For example, when a customer calls into a call center, they may be prompted to press "3" if they have a question regarding their invoice, and then, after the user presses "3", the call is sent to a representative handling invoice questions. These allocations of calls based on gross categories will rarely be accurate and are highly subjective. Further, many calls cover more than one topic. If the caller in this example also has a warranty question, and a question regarding an accessory they wish to buy, the invoice attendant has to transfer the call to a different agent that handles warranty issues and another agent in the sales department. The customer frequently gets bounced around to different attendants. This can lead to frustrating experiences, with the customer having to explain their situation repeatedly to different attendants, waste of time, and other problems.

This invention provides a more objective and robust way to analyze calls and to help a service provider better understand calls and to improve call-handling and service-providing. The features of this invention are applicable to call centers generally. It is generally applicable regardless of industry, type of business or organization, or technology platform underlying the call center.

SUMMARY OF THE INVENTION

In a first aspect, a method is provided for processing live voice calls between customers and one or more agents associated with a call center. The method includes the step of directing the voice calls from the customers to the one or more agents. The customers engage in conversation with the agents to discuss the problem or issues that the customers are having. Meanwhile, as the call is progressing, the method includes the step of monitoring the voice calls with an automated speech recognition engine to detect speech patterns which are associated with topics or issues that might be raised during the voice calls. The speech recognition engine will typically be programmed with a grammar comprising a set of speech utterances that are associated with expected topics. The nature of the grammar will vary depending on the context of the goods or services that are rendered to the customer. The method further includes the step of storing a record of the topics associated with the speech patterns detected by the speech recognition engine in a database.

The record of topics stored in the database can be used in a variety of ways. For example, it can be mined for patterns of topics that occur. Reports can be generated to display the topics that are occurring. Trends can be tracked. The reports can be used to facilitate training of the agents. As another example, when a particular topic is mentioned during the call, logic associated with the speech recognition engine can generate messages to the agents that facilitate handing of the call. The messages can be integrated with desktop software present at the agent's workstation to drive interaction with the customer, depending on the topic in question. Examples of these uses are described in further detail below.

In another aspect, a method of processing live voice calls between customers and one or more agents associated with the call center is provided. The method includes the steps of directing the voice calls from customers to the one or more agents, monitoring the voice calls with an automated speech recognition engine to detect speech patterns associated with topics raised during the voice calls, and using the speech patterns detected by the speech recognition engine to generate messages to the one or more agents to facilitate the one or more agents responding to calls from the customers.

In yet another aspect of the invention, a system is provided for processing live voice calls between customers and one or more agents associated with the call center. The system includes a call center comprising a plurality of workstations staffed by a plurality of agents, an automated speech recognition engine monitoring voice calls between the customers and the agents and programmed to detect speech patterns associated with topics raised during the voice calls, and a database storing a record of the topics associated with the speech patterns detected by the speech recognition engine.

DETAILED DESCRIPTION OF PREFERRED EMBODIMENT

System Overview

Figure 1:
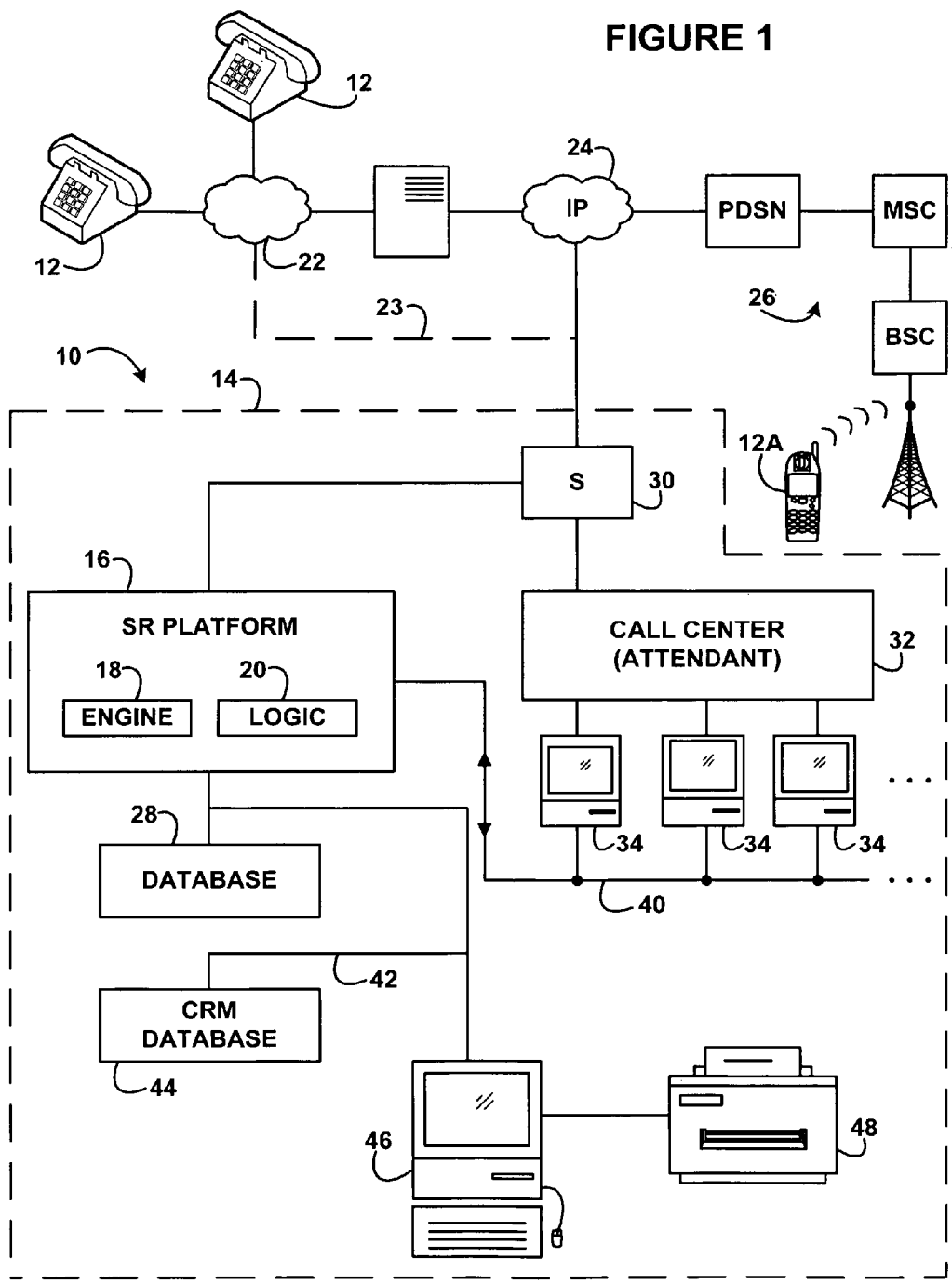
FIG. 1 is an illustration showing the elements of a system in according to a representative embodiment of the invention, showing a plurality of callers that call into a central call center.

FIG. 1 is an illustration showing the elements of a system 10 in according to a representative embodiment of the invention, showing a plurality of callers 12 that call into a central call center 14. The call center 14 includes a speech recognition platform 16 which includes a speech recognition engine 18 and associated logic 20, described below. The speech recognition engine 18 is preferably programmed with a grammar comprising a set of speech utterances that are deemed to be associated with particular topics. A database 28 stores a record of the topics that are detected by the speech recognition engine 18.

The callers can include land line callers 12 that call into the central call center 14 using the public switched telephone network 22, as indicated by dashed line 23. It is also possible to transport voice over packet networks, in which case the public switched telephone network is connected to an Internet Protocol transport network 24 which uses packet switching techniques to carry the voice packets between the customers 12 and the call center 14. The transport network 24 could be a telephone service provider backbone network or the Internet. These details are not important. It is also noted that the customers 12 could use a cell phones 12A and a cellular telephone infrastructure 26 to communicate between the call center 14 and the customers.

The voice (speech) between the customers 12 and the call center is sent along a network in the call center 14 to a device 30, which may be a splitter, packet switch, router, or other device. The purpose of the device 30 is to send the speech data to both a speech recognition platform 16 and to a central call center attendant 32. The call center attendant 32 is a combination of software and hardware functions that answers the calls as they come in. In a representative embodiment, it will perform any preliminary processing of the call (e.g., "press 1 to speak to a customer service representative"), and forwards the call to a particular customer service agent. The call center attendant 32 can include a speech to text converter, text to speech converter, and other functions, the nature of which will depend on the requirements of the system. Each customer service agent is associated with a workstation 34. An attendant 32 such as shown in the FIGURE is known in the art and therefore a detailed discussion is omitted.

The speech recognition platform 16 may include other functions and features in addition to the speech recognition engine 18 and logic 20, for example speech to text conversion, text to speech engines, and other functions associated with a voice command platform. The call center 14 is shown with local area networks 40 and 42. The network 40 couples the speech recognition platform 16 to the agent workstations, and provides a communication path for transmitting assistance messages, described below, from the speech recognition platform 16 to the workstations 34.

The network 42 couples the speech recognition platform 16 to a database 28. The database 28 stores a record of topics raised during the calls between the customers and the customer service agents. The center 14 also includes a customer relations management database 44 storing customer profile data for the customers 12. The center also includes one or more workstations 46 that access databases 28 and 44 to prepare reports as described below. The workstation 46 could have an attached printer 48 for printing the reports and furnishing the reports to management or customer service agents.

Method of Operation

As noted above, a primary aspect this invention involves using a speech recognition engine 18 to monitor call center calls. The method includes the step of directing the voice calls from the customers 12 to the one or more agents (not shown in the FIGURE, but typically each agent will be associated with one of the workstations 34). The customers engage is conversation with the agents to discuss the problem or issues that the customer is having that prompted the call. Meanwhile, as the call is progressing, the calls are preferably monitored by the automated speech recognition engine 18 to detect speech patterns associated with topics raised during the voice calls. The speech recognition engine will typically be programmed with a grammar comprising a set of speech utterances that are associated with expected topics. Some examples are given below. The nature of the grammar will vary depending on the context of the goods or services that are rendered to the customer. The method further includes the step of storing a record of the topics associated with the speech patterns detected by the speech recognition engine 18 in the database 28.

The record of topics stored in the database 20 can be used in a variety of ways. For example, it can be mined for patterns of topics that occur. Reports can be generated (e.g., by the workstation 46) that analyze the topics that are occurring. Trends in topics that are raised can be tracked. The reports can be used to facilitate training of the agents. As another example, when a particular topic is mentioned during the call, logic 20 associated with the speech recognition engine can generate messages to the agents that facilitate handing of the call. Examples of these uses are described in further detail below.

As a further example of how the invention might be implemented in a situation where the call center 14 is associated with a service provider of telephone service, the SR engine 18 will be configured with a set of grammars that are deemed to be relevant in this context. By way of example, utterances that are a close proximity of the words "BILL" and "HIGH" may reflect a discussion of high bills. (E.g., "My BILLS have been HIGH.")

Based on the grammars detected by the SR engine, the invention may involve (i) generating statistical reports concerning call center call topics, and (ii) providing assistance to the call center operators. The reports can be generated after the fact, or on the fly in real-time. The assistance to the call center operators can be provided in the form of a series of messages from the platform 16 to the workstation that provide instructions (e.g., call handling instructions) presented on the workstation 34 user interface or terminal.

Alternatively, the assistance to the call center operators can be provided after the fact, e.g., during the next call handled by the operator or in the form of a periodic training guide. The reports could further perform the function of a quality control analysis of the agent's performance. The reports could be generated on a variety of bases, such as periodically, by type of complaint or topic detected, by customer, by customer type, etc.

In one embodiment, the SR engine 18 will monitor just what the caller utters during the call. In another embodiment, the SR engine 18 will monitor just what the agent utters during the call. In yet another embodiment, the SR engine will monitor both what the caller utters and what the agent utters.

Referring again to the telephone company example, the caller may utter the phrase "I cannot place calls." The SR engine 18 may have grammar to detect this utterance and associate it with the topic "unable to place calls". Many reasons may exist for that problem. If the agent then utters something that reflects the reason for the problem, such as "You have NOT PAID your BILL," the SR engine 18 may pick that up as a more accurate indication of the call topic. The record for this call stored in the database 28 could then reflect two topics that occurred (1) a customer was unable to place calls and (2) customer did not pay their bill. As speech can take a variety of nuances depending on such factors as age, accent, speech impediment, and native language of speaker, etc., the SR engine may be programmed to assign a confidence level to the detection of speech patterns and including the confidence level in the record in the database 28.

Each record stored in the database 28 may include one or more of the following items:
  Customer identification
  Agent identification
  Time stamp of when the call occurred
  Topics raised during call (based on grammar recognized by SR engine)
  Confidence level in topics raised
  .wav or other audio file comprising speech for all or part of the call
  agent response to call or other action taken
  product or service complained about
  assist messages, if any, sent to agent during call
  reports generated using the record
  Other The invention may further involve correlating the detected utterances with customer profile data maintained in a Customer Relations Management (CRM) database 44. For example, if the reports are using the detected utterances as a basis for generating trending reports regarding call center call topics, the reports could indicate which callers were calling (new customers, old customers, high value customers, customers from a particular region, etc.) As another example, the invention may involve segregating call report data, or taking some other action, based on the account age of the caller, i.e., how long the caller has been a customer. For instance, complaints from callers who have been subscribers for many years might be highlighted or viewed as more significant than complaints from callers who are brand new subscribers. Other examples are of course possible as well.

As a general matter, the SR engine 18 monitoring can be done (i) in real-time during the calls, or (ii) after the calls by analysis of recordings of the calls. For report generation, either would work fine. If the monitoring is done after calls occur, i.e., not in a real time mode, then a data storage system will be included in the system 10 of FIG. 1 to store the calls. The speech recognition engine will then access this data storage to perform the call monitoring and analysis later on. (Privacy considerations may require notification to the customer that the call is being recorded, as is typical in this art).

If there is a need by the system to distinguish caller utterances from operator utterances, and if the SR monitoring is being done after-the-fact, then the caller's speech can be recorded separately from the operator's speech, to facilitate separate analysis. For example, the speech could be transported in the network internal to the call center in packets, each packet having a source ID header. The source ID header would be one address or ID for the agent and another address or ID for the caller. The speech from the caller and the agent could be sorted according to the source ID for the packets.

The ability to render assistance to the agents handling the calls in real time is one of the benefits that can be provided by the disclosed system. In particular, the speech recognition platform is provided with logic 20 in the form of instructions (software) that tracks the spoken utterances of the caller and/or agent, and in particular the speech recognition processing of the utterances and detected grammar, and when certain grammar is detected, messages are transmitted to the agent. The messages may assist the agent in responding to the customers. The messages could take a variety of forms. The messages could be in the form of prompts that appear on the workstation 34 user interface and prompt the agent to ask certain questions or obtain certain information. The messages could cause the application or operating system of the workstation to change the display on the user interface, e.g. generate new tabs, highlight certain fields, display prompt or other messages, or other. The messages could take the form of encoded instructions that display a prompt the agent to access a certain file (e.g., a file directed to a particular topic). The instructions could take the form, for example, of directives for the agent to ask the caller certain questions or to tell the caller certain things. As another example, messages could be sent to the workstations that are processed by desktop software running on the workstation to drive the interaction with the customer, depending on the topic in question. For example, the message could activate a subroutine that prompts the agent to ask certain questions, provide certain information to the customer, or provide other assistance in handling the topic. Obviously, the concept of real-time assistance to agents based on SR engine detected topics can be implemented in a myriad number of ways depending on the nature of the goods or services, the design of the call center, the capabilities and training of the agents, the nature of the problem or issue that is raised, and still other factors. It is therefore not possible to list them all, but persons skilled in the art will be able to develop such functionality in the logic module 20 and the workstations 34 from the present description coupled with the knowledge possessed by persons skilled in this art. The messages could be generated automatically by the logic 20. As another possibility, the messages could be generated by a supervisor that is monitoring the calls.

From the foregoing, it will be appreciated that we have described a method of processing live voice calls between customers and one or more agents associated with a call center, comprising the steps of directing the voice calls from customers to the one or more agents; monitoring the voice calls with an automated speech recognition engine 18 to detect speech patterns associated with topics raised during the voice calls, and using the speech patterns detected by the speech recognition engine to generate messages to the one or more agents to facilitate the one or more agents responding to calls from the customers.

Variation from the specifics of the disclosed embodiments is of course possible without departure from the scope of the invention. This scope is to be determined by reference to the appended claims.

We claim:

1. A method of processing live voice calls between customers and one or more agents associated with a call center, comprising the steps of:
  directing the voice calls from customers to the one or more agents;
  monitoring the voice calls with an automated speech recognition engine to detect speech patterns associated with substantive topics raised during the voice calls, and while the voice calls are ongoing, when certain grammar in the speech patterns is detected and recognized by the speech recognition engine, responsively generating messages to a workstation associated with the one or more agents to facilitate the one or more agents responding to the substantive topics associated with the certain grammar raised in the voice calls from the customers, wherein the messages include prompts appearing on the workstation prompting the one or more agents to ask certain questions based on the recognized grammar in the voice calls.

2. The method of claim 1, further comprising the steps of storing a record of the topics associated with the speech patterns detected by the speech recognition engine in a database.

3. The method of claim 1, wherein the voice calls include speech from the customers and speech from one or more agents associated with the call center, and wherein the speech recognition engine monitors both the speech from the customer and the speech from the one or more agent.

4. The method of claim 1, wherein the messages include a message causing a user interface of the workstation to change the display of the user interface.

5. The method of claim 1, wherein the messages include encoded instructions that display a prompt for the agent to access a certain file.

6. The method of claim 1, wherein the messages include a message activating a sub-routine in a software application running on the workstation.

7. A system for processing live voice calls between customers and one or more agents associated with the call center, comprising:
   a call center comprising a plurality of workstations staffed by a plurality of agents;
   an automated speech recognition engine monitoring voice calls between the customers and the agents and programmed to detect speech patterns associated with substantive topics raised during the voice calls,
   a database storing a record of the substantive topics associated with the speech patterns detected by the speech recognition engine; and
   logic associated with the speech recognition engine generating messages to a workstation associated with the agent, based on certain grammar in the speech patterns being detected and recognized by the speech recognition engine;
   wherein the messages are generated in real-time during the calls between the customers and the agents, and wherein the messages include prompts appearing on the workstation prompting the agent to ask certain questions based on the certain grammar in the voice calls.

8. The system of claim 7, wherein the system includes a processing element generating reports based on the information in the database.

9. The system of claim 7, further comprising logic associated with the speech recognition engine for correlating the detected grammar with customer profile data maintained in a customer relations management database.

10. The system of claim 7, wherein the messages include a message causing a user interface of the workstation to change the display of the user interface.

11. The system of claim 7, wherein the messages include encoded instructions that display a prompt for the agent to access a certain file.

12. The system of claim 7, wherein the messages include a message activating a sub-routine in a software application running on the workstation.

* * * * *